(12) United States Patent
Fredette et al.

(10) Patent No.: US 7,436,185 B2
(45) Date of Patent: Oct. 14, 2008

(54) HIGHLY INTEGRATED LOGGING TOOL

(75) Inventors: Mark A. Fredette, Houston, TX (US); Martin E. Poitzsch, Derry, NH (US)

(73) Assignee: Schlumberger Technology Corporation, Sugar Land, TX (US)

( * ) Notice: Subject to any disclaimer, the term of this patent is extended or adjusted under 35 U.S.C. 154(b) by 98 days.

(21) Appl. No.: 11/160,490

(22) Filed: Jun. 27, 2005

(65) Prior Publication Data
US 2006/0290354 A1   Dec. 28, 2006

(51) Int. Cl.
*G01V 3/00* (2006.01)
*G01V 5/12* (2006.01)
*G01V 5/10* (2006.01)
*G01V 1/40* (2006.01)

(52) U.S. Cl. .................... 324/367; 324/373; 250/269.3; 250/269.4; 181/102

(58) Field of Classification Search ................. 324/367, 324/373, 374, 375; 367/25; 250/269.3, 269.4; 181/102
See application file for complete search history.

(56) References Cited

U.S. PATENT DOCUMENTS

| | | | |
|---|---|---|---|
| 1,193,382 A | 8/1916 | Hayes et al. |
| 2,934,652 A | 4/1960 | Caldwell et al. |
| 2,957,990 A | 10/1960 | Newton et al. |
| 2,961,544 A | 11/1960 | Youmans et al. |
| 2,961,600 A | 11/1960 | Tanguy |
| 3,017,566 A | 1/1962 | Schuster |
| 3,116,449 A | 12/1963 | Vogel |
| 3,136,942 A | 6/1964 | Schuster |
| 3,240,938 A | 3/1966 | Hall, Jr. |
| 3,263,083 A | 7/1966 | Johnson et al. |
| 3,281,599 A | 10/1966 | Baker et al. |
| 3,305,771 A | 2/1967 | Arps |
| 3,306,102 A | 2/1967 | Lebourg |
| 3,321,627 A | 5/1967 | Tittle |
| 3,376,950 A | 4/1968 | Grine |
| 3,377,550 A | 4/1968 | Osoba et al. |
| 3,405,351 A | 10/1968 | Schuster |

(Continued)

FOREIGN PATENT DOCUMENTS

WO   WO 2004029663 A1 *  4/2004

OTHER PUBLICATIONS

Ellis, D. et al., Litho-Density Tool Calibration, Society of Petroleum Engineers, Aug. 1985, pp. 515-520.

(Continued)

*Primary Examiner*—Reena Aurora
*Assistant Examiner*—David M. Schindler
(74) *Attorney, Agent, or Firm*—Darla Fonseca; Jaime Castano

(57) ABSTRACT

An apparatus for logging a formation traversed by a borehole includes a plurality of logging tools adapted for conveyance inside the borehole. The plurality of logging tools includes a tool body, a sensing pad responsive to a density property of the formation coupled to the tool body, a current emitting measure electrode responsive to a lateral resistivity property of the formation incorporated on the sensing pad, a mechanism for urging the sensing pad in contact with a side of the borehole coupled to the tool body, and a pair of mass isolation bands disposed about the tool body to isolate a mass of the tool body adjacent the measure electrode.

17 Claims, 3 Drawing Sheets

U.S. PATENT DOCUMENTS

| | | | |
|---|---|---|---|
| 3,488,574 A * | 1/1970 | Tanguy | 324/373 |
| 3,564,914 A | 2/1971 | Desai et al. | |
| 3,579,098 A | 5/1971 | Mougne | |
| 3,794,976 A | 2/1974 | Mickler | |
| 3,849,721 A | 11/1974 | Calvert | |
| 4,019,125 A | 4/1977 | Daniel | |
| 4,166,215 A | 8/1979 | Anderson | |
| 4,166,216 A | 8/1979 | Cubberly, Jr. | |
| 4,383,220 A | 5/1983 | Baldwin | |
| 4,416,151 A | 11/1983 | Ullo | |
| 4,588,951 A | 5/1986 | Ohmer | |
| 4,594,552 A | 6/1986 | Grimaldi et al. | |
| 4,614,250 A | 9/1986 | Panetta et al. | |
| 4,618,765 A | 10/1986 | Sonne | |
| 4,638,158 A | 1/1987 | Sonne et al. | |
| 4,692,707 A | 9/1987 | Locke et al. | |
| 4,790,381 A | 12/1988 | Armell | |
| 4,972,082 A | 11/1990 | Loomis et al. | |
| 5,055,788 A | 10/1991 | Kleinberg et al. | |
| 5,130,705 A | 7/1992 | Allen et al. | |
| 5,291,137 A | 3/1994 | Freedman | |
| 5,335,542 A | 8/1994 | Ramakrishnan et al. | |
| 5,377,161 A | 12/1994 | Meehan | |
| 5,390,115 A | 2/1995 | Case et al. | |
| 5,420,422 A | 5/1995 | Loomis | |
| 5,426,368 A | 6/1995 | Benimeli et al. | |
| 5,528,029 A | 6/1996 | Chapellat et al. | |
| 5,528,495 A | 6/1996 | Roscoe | |
| 5,528,556 A * | 6/1996 | Seeman et al. | 367/25 |
| 5,574,263 A | 11/1996 | Roesner | |
| 5,596,191 A | 1/1997 | Mickael | |
| 6,065,218 A | 5/2000 | Edwards | |
| 6,140,817 A | 10/2000 | Flaum et al. | |
| 6,647,637 B2 | 11/2003 | Lechen | |

OTHER PUBLICATIONS

Schlumberger Platform Express brochure, pp. 1-15, Sep. 2001.

* cited by examiner

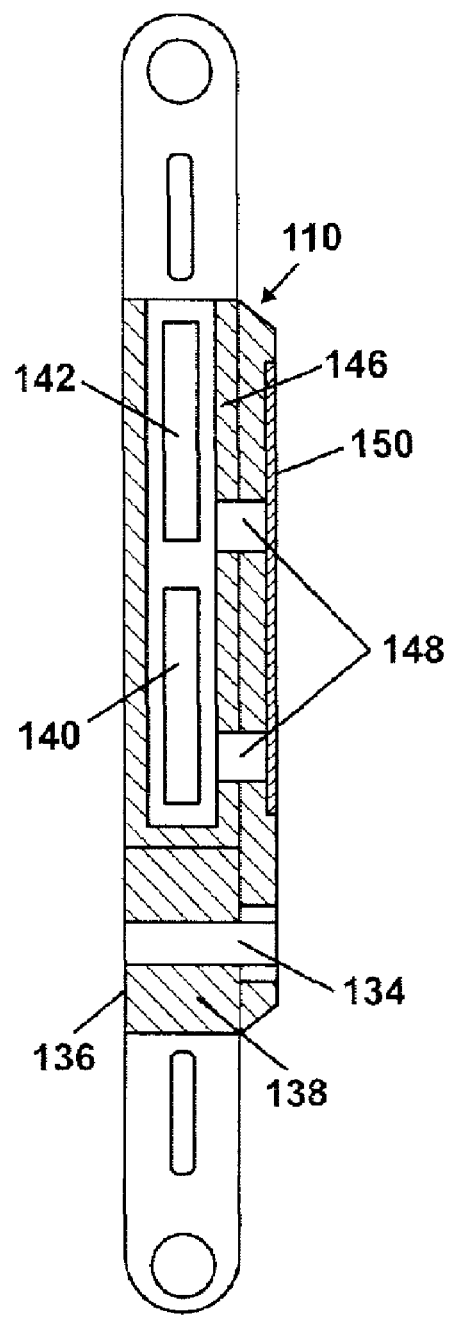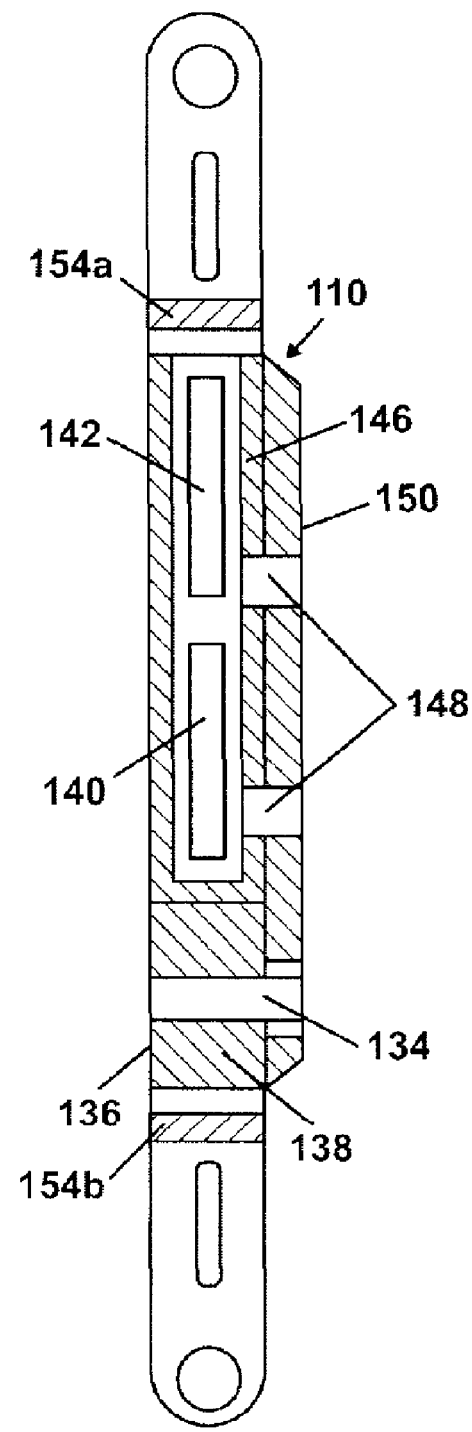
FIG. 1B
FIG. 1C

HIGHLY INTEGRATED LOGGING TOOL

BACKGROUND OF THE INVENTION

The invention relates to apparatus for obtaining subsurface measurements.

Subsurface formation logs contain data related to one or more properties of a formation as a function of depth. A formation log is typically recorded as a logging tool traverses a borehole penetrating a formation of interest. The logging tool may be conveyed in a number of ways, e.g., on cable, on drill pipe, or on coiled tubing. For operational efficiency, it is common to include a combination of logging tools in a single logging run. One example of a combination of logging tools is a triple-combo tool, which measures formation density, porosity, deep and/or intermediate and/or shallow resistivity, natural gamma radiation, and borehole size in a single logging run. The standard triple-combo tool uses a separate tool to measure each type of formation property. While the individual tools are very modular, a tool string assembled from these modular tools is long, typically about 90 ft (27.4 m), and time consuming to setup and run into and out of the borehole.

Operating cost and equipment cost contribute to the cost of logging. Both may be reduced by making tools smaller and simpler. Smaller and lighter tools are easier to transport, setup, and operate. Simpler tools are cheaper to build. Integrating measurements and adopting novel approaches to implementing measurements can reduce tool size and complexity. Even a highly integrated tool can be broken down into several sections to optimize transport and handling. However, depending on the degree of integration, there may not be a one-to-one relationship between measurements and sections. Schlumberger offers an integrated wireline logging tool under the trade name Platform Express™ that is about half the length of the standard triple-combo tool. The integrated wireline logging tool includes an integrated gamma-ray and neutron sonde, a high-resolution mechanical sonde with associated electronics cartridge and pad-mounted measurements, and a high-resolution azimuthal laterolog sonde or array induction imager tool.

SUMMARY OF THE INVENTION

In one aspect, the invention relates an apparatus for logging a formation traversed by a borehole which comprises a plurality of logging tools adapted for conveyance inside the borehole. The plurality of logging tools comprises a tool body, a sensing pad responsive to a density property of the formation coupled to the tool body, a current emitting measure electrode responsive to a lateral resistivity property of the formation incorporated on the sensing pad, and a mechanism for urging the sensing pad in contact with a side of the borehole coupled to the tool body. The apparatus further includes a pair of mass isolation bands disposed about the tool body to isolate a mass of the tool body adjacent the measure electrode.

In another aspect, the invention relates to an apparatus for logging a formation traversed by a borehole which comprises a tool body adapted for conveyance inside the borehole, a sensing pad responsive to a density property of the formation coupled to the tool body, a current emitting measure electrode responsive to a lateral resistivity property of the formation incorporated on the sensing pad, and a mechanism for urging the sensing pad in contact with a side of the borehole coupled to the tool body.

In yet another aspect, the invention relates to a method of logging a formation traversed by a borehole which comprises disposing in the borehole a tool body carrying a sensing pad responsive to a density property and lateral resistivity property of the formation, moving the tool body in the borehole while urging the sensing pad in contact with a side of the borehole, emitting current from a measure electrode incorporated on the sensing pad, measuring flow of current into the formation, wherein the flow of current is proportional to the lateral resistivity property, emitting gamma radiation from a gamma source incorporated in the sensing pad, and detecting gamma particles returning from the formation, wherein energies of the gamma particles are proportional to the density property.

Other features and advantages of the invention will be apparent from the following description and the appended claims.

BRIEF DESCRIPTION OF DRAWINGS

FIGS. 1B and 1C are cross-sectional views of sensing pads according to embodiments of the invention.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to avoid unnecessarily obscuring the invention.

Figure 1A:
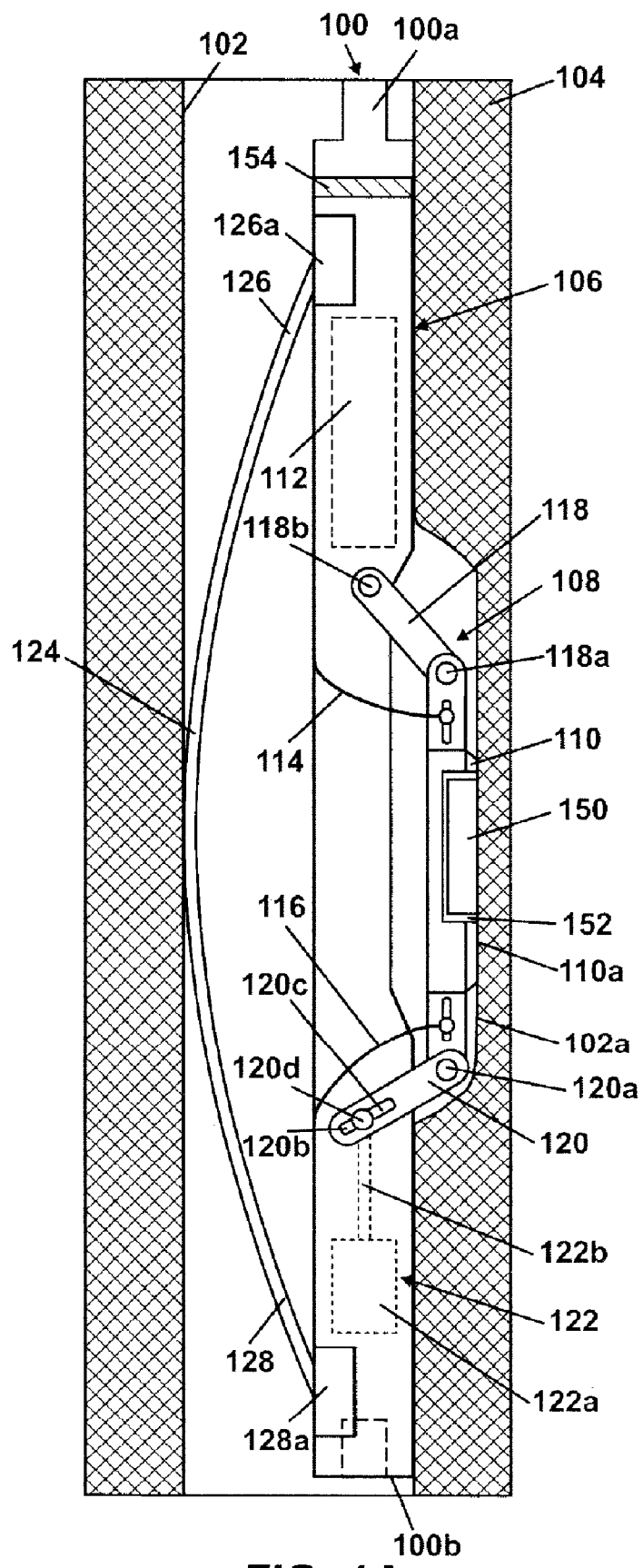
FIG. 1A shows a logging tool according to one embodiment of the invention.

FIG. 1A shows a logging tool 100 according to one embodiment of the invention. The logging tool 100 is shown in a borehole 102 drilled through a formation 104. The logging tool 100 may be conveyed inside the borehole 102 in a number of ways, including, but not limited to, on the end of a wireline, slickline, coiled tubing, or drill pipe. The logging tool 100 has ends 100a, 100b for connection to other logging tools. In one embodiment, the logging tool 100 measures formation density and lateral formation resistivity. Examples of logging tools that may be combined with the logging tool 100 to form a tool string include, but are not limited to, sonic, propagation resistivity, neutron, gamma ray, nuclear magnetic resonance, formation pressure, imaging, dipmeter, and ultrasonic caliper tools. Logging tools combined with logging tool 100 can be suitably chosen to make desired logs, e.g., triple-combo logs.

The logging tool 100 includes a tool body 106, which is typically made of metal and is rugged enough to withstand the borehole environment. A pad assembly 108 is coupled to the tool body 106. The pad assembly 108 includes a sensing pad 110, which carries one or more detectors that respond to acoustic, nuclear, or electrical stimuli. The sensing pad 110 may also carry one or more sources that emit acoustic, nuclear, or electrical stimuli. To measure borehole/formation properties, the sensing pad 110 contacts a surface of the borehole 102 and emits an appropriate stimuli into the formation 104 and/or responds to an appropriate stimuli from the formation 104. An electronics cartridge 112, which may be located inside or external to the tool body 106, cooperates with the sensing pad 110 to make desired measurements. The electronics cartridge 112 includes appropriate circuitry to power the source(s)/detector(s) on the sensing pad 110 and to process and transmit signals. The measurement data may be sent to the surface in real-time or stored in tool memory and retrieved when the logging tool 100 is pulled to the surface as known in the art.

The pad assembly 108 includes a mechanism that urges the sensing pad 110 in contact with a side of the borehole 102. This mechanism may be any mechanism that effectively urges the sensing pad 110 in contact with a surface of the borehole 102. Preferably, the mechanism minimizes standoff, i.e., distance between the face 110a of the sensing pad 110 and the side of the borehole 102, under various operating conditions resulting from the varied geometrical shapes of the borehole wall. One example of a mechanism that may be used in the invention is a back-up arm mechanism such as disclosed in U.S. Pat. No. 4,594,552 (Grimaldi et al.). In this patent, the arm mechanism includes an arm at the end of which is mounted a sensing pad. The arm is pivotally connected to the tool body. The end of the arm farthest from the sensing pad includes an integral extension that is resiliently connected to the tool body. A backup arm is pivotally connected to the extension and resiliently biased away from the tool body. In the extended position, the backup arm engages one side of the borehole wall while urging the sensing pad in contact with the opposite side of the borehole wall.

FIG. 1A discloses another mechanism for urging a sensing pad in contact with a borehole wall. The mechanism includes a pad bias mechanism for urging the sensing pad 110 in contact with a side of a borehole 102 and a tool bias mechanism for urging the side of the tool body 106 adjacent the sensing pad 110 in contact with the side of the borehole 102. The pad bias mechanism works independently of the tool bias mechanism. In one embodiment, the pad bias mechanism includes at least one resilient member or spring 114, such as a leaf spring, and at least one linkage arm 118 coupled between the tool body 106 and a distal end of the sensing pad 110. Preferably, the pad bias mechanism includes an additional resilient member or spring 116 and linkage arm 120 coupled between the tool body 106 and the other distal end of the sensing pad 110. The linkage arm 120 may be coupled to the other distal end or middle of the sensing pad 110. The spring 116 would also urge the sensing pad 110 away from the tool body 106 while the linkage arm 120 would limit how far the sensing pad 110 can move away from the tool body 106.

The linkage arm 118 may be coupled to the sensing pad 110 and the tool body 106 by joints 118a, 118b, respectively. The linkage arm 120 may be coupled to sensing pad 110 and tool body 106 by joints 120a, 120b, respectively. The joints 118a, 118b, 120a, 120b could be implemented in any number of ways, but they are generally pivot or hinge joints so as to allow the sensing pad 110 to pivot relative to the tool body 106. The pivot or hinge joints may be provided by mating pins and holes or other suitable structures. In one embodiment, at least one of the linkage arms 118, 120 is slidable relative to the tool body 106, thereby providing flexibility in positioning the sensing pad 110 relative to the tool body 106. For example, it may be desirable to move the sensing pad 110 between a retracted position, wherein the face 110a of the sensing pad 110 is flush or nearly flush with the tool body 106, and a deployed position, wherein the sensing pad 110 can make contact with irregularities, such as depression 102a, in a side of the borehole 102. In one embodiment, the joint 120b includes a slot 120c that mates with a pin 120d coupled to the tool body 106. Thus, the linkage arm 120 may slide relative to the tool body 106 by simply allowing the pin 120d to ride in the slot 120c as the tool body 106 traverses the borehole 102.

It may be desirable to control sliding of the linkage arm 120 relative to the tool body 106. In one embodiment, sliding of the linkage arm 120 is controlled through the use of an actuator 122 located within the tool body 106. The actuator 122 could include a motor 122a which drives an actuator rod 122b, such as a lead screw. In this example, the pin 120d is coupled to the actuator rod 122b. The motor 122a may then be operated as needed to extend or retract the actuator rod 122b, thereby moving the pin 120d inside the slot 120c, thereby causing the linkage arm 120 to slide relative to the tool body 106. In another embodiment, sliding of the linkage arm 120 is controlled through the use of a one-shot release system (not shown), such as a one-shot electrical latch, e.g., a solenoid and hook linkage. In this case, the linkage arm 120 is latched to the tool body 106 using the one-shot release system. The one-shot release system prevents sliding of the linkage arm 120 until a desired time when the one-shot release system is activated or released.

The pad bias mechanism has been described with respect to springs 114, 116 biasing the sensing pad 110 away from the tool body 106. In an alternate embodiment, the springs 114, 116 may be omitted and a coil spring may be used to bias the sensing pad 110 away from the tool body 106. In the current embodiment shown in FIG. 1A, the coil spring (not shown) could replace the motor 122a. The coil spring would be coupled between the actuator rod 122b and the tool body 106. Initially, the coil spring can be latched to the tool body 106 using, for example, a one-shot electrical latch. This would also serve to prevent sliding of the linkage arm 120. At a desired time, the one-shot electrical latch can be activated or released. This would then allow the coil spring to extend the actuator rod 122b. The actuator rod 122b is coupled to the linkage arm 120. Thus, extension of the actuator rod 122b would serve to bias the sensing pad 110 away from the tool body 106. In this case, it is not necessary that the linkage arm 120 has the slot 120c, and a simple pin and hole connection between the linkage arm 120 and the actuator rod 122b would suffice.

To minimize surface wear of the sensing pad 110, particularly if the sensing pad 110 is run into the borehole 102 in a deployed position, easily replaceable wear buttons, plates, or housings may be used to protect the sensing pad 110. These surface wear protectors would be long-wearing parts and provide a minimal standoff so that the measurement quality is not affected and may incorporate a time-to-replace-me indicator.

In one embodiment, the tool bias mechanism that urges the side of the tool body 106 adjacent to the sensing pad 110 in contact with a side of the borehole 102 includes a flexible member 124, such as a bow spring, located opposite the sensing pad 110. The ends 126, 128 of the bow spring 124 are coupled to the tool body 106 by joints 126a, 128a, respectively. The joints 126a, 128a can be implemented in any number of ways. In one embodiment, the joints 126a, 128a allow pivoting and/or sliding of the bow spring ends 126, 128 relative to the tool body 106. In one embodiment, the joint 126a includes mating pin and hole, and the joint 128a includes mating pin and slot. The mating pin and hole at joint 126a allow pivoting of the bow spring end 126 relative to the tool body 106. The mating pin and slot at joint 128a allow pivoting and sliding of the bow spring end 128 relative to the tool body 106. Thus, the bow spring 124 can expand and contract as the tool body 106 traverses the borehole 102.

When the bow spring 124 engages one side of the borehole 102, it presses the tool body 106 against the opposite side of the borehole 102. A wall-engaging pad (not shown) may be attached to the middle portion of the bow spring 124. As the tool body 106 traverses the borehole 102 the motion of the bow spring 124 may be monitored and translated into borehole caliper measurement. The force of the bow spring 124 is designed to hold the entire tool body 106 against a side of the borehole 102. The force of the springs 114, 116 (or coil spring if used) is designed to maintain the sensing pad 110 in contact with the formation 104 even in the presence of local irregularities, such as depression 102a shown in a side of the borehole 102.

In one embodiment, the logging tool 100 is configured to measure density of the formation 104 using, for example, a conventional dual-detector gamma-gamma measurement configuration. Referring to FIG. 1B, this configuration includes a gamma ray source 134 mounted in the body 136 of the sensing pad 110. The gamma ray source 134 is surrounded by a shield 138 made of a high density shielding material, such as tungsten. Gamma ray detectors 140, 142 are also mounted in the body 136 of the sensing pad 110. The detectors 140, 142 are longitudinally aligned with the source 134. The detector 140 closest to the source 134 is known as the short-spaced detector, and the detector 142 farthest from the source 134 is known as the long-spaced detector. Intermediate and backscattering detectors may also be provided in the pad body 136 as taught in, for example, U.S. Pat. No. 5,390,115 (Case et al.) and U.S. Pat. No. 5,528,029 (Chapellat et al.), respectively. A shield 146 made of a high density shielding material, such as tungsten, is mounted on the pad body 136. The source 134 and detectors 140, 142 communicate with the formation (104 in FIG. 1A) through windows 148, made of material transparent to gamma rays, such as epoxy resin, in the shield 146.

Returning to FIG. 1A, the logging tool 100 configured as described above measures formation density in a conventional manner. To measure formation density, the logging tool 100 is lowered to a desired depth in the borehole 102. Also, the sensing pad 110 is pressed against a side of the borehole 102. As the logging tool 100 ascends the borehole 102, the source (134 in FIG. 1B) emits gamma radiation and the detectors (140, 142 in FIG. 1B) detect gamma returning particles and generate output pulses in response. The energies of the detected gamma particles are representative of specific interaction phenomena between the gamma particles emitted by the source 134 and the atoms in the formation. The output pulses are received by the electronics cartridge 112, which counts the output pulses for a predetermined time period at appropriate time intervals and converts the total count for each detector 140, 142 to a count rate. The count rate is then expressed for each detector 140, 142 as a function of the energy of each gamma particle. A calibration process is used to determine formation density from the count rates of each detector 140, 142.

In addition to measuring density of the formation 104, the logging tool 100 is also configured to measure lateral resistivity of the formation 104. In one embodiment, the pad assembly 108 includes a current emitting measure electrode 150, which is built on a non-conductive pad 152, e.g., made from rubber, fiberglass, plastic, or ceramic, and is installed on the face 110a of the sensing pad 110. The measure electrode 150 could be a single electrode or multiple electrodes. Multiple electrodes would provide degrees of freedom in establishing various focusing conditions and/or could be used to mitigate effects of contact impedance. Wires connected to the electrodes are fed into the sensing pad 110. These wires in turn connect to the resistivity electronics. The electronics may be housed in the sensing pad 110 itself, in the electronics cartridge 112, or in another tool in the tool string. A pair of mass isolation (or insulating) bands are placed at the ends of the logging tool 100. This allows the isolated mass of the logging tool 100 to be used as a bucking electrode. In this figure, only one of the mass isolation bands, e.g., mass isolation band 154, is integrated with the end 100a of the logging tool 100. The other mass isolation band is integrated with a logging tool that would be attached to the end 100b of the logging tool 100; although, it is also possible to integrate the other mass isolation band at the end 100b of the logging tool 100. An alternative to installing the measure electrode 150 on the sensing pad 110 is to isolate the sensing pad 110 from the tool body 106 and then use the isolated sensing pad 110 as a measure electrode. This could be done, for example, by integrating mass isolation bands on the pad assembly 108. For example, FIG. 1C shows mass isolation bands 154a, 154b integrated on the pad assembly 108, about the sensing pad 110.

Figure 2A:
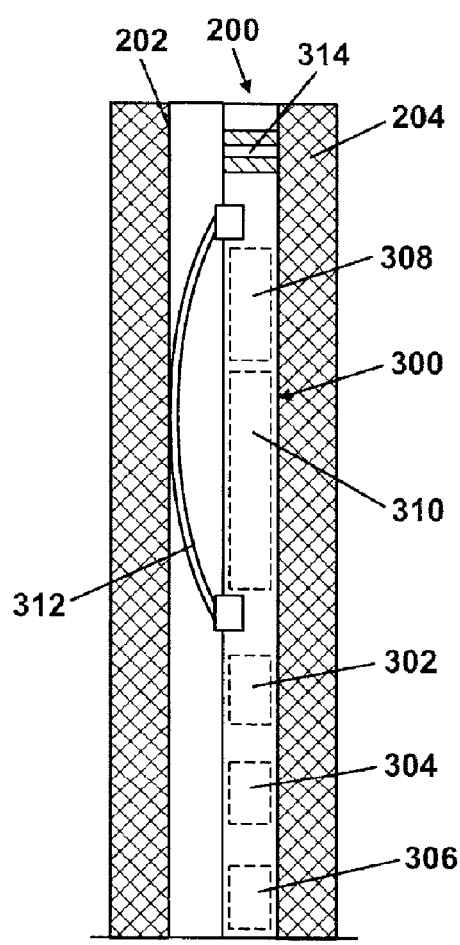
FIGS. 2A and 2B show a tool string including the logging tool of FIG. 1A.
Figure 2B:
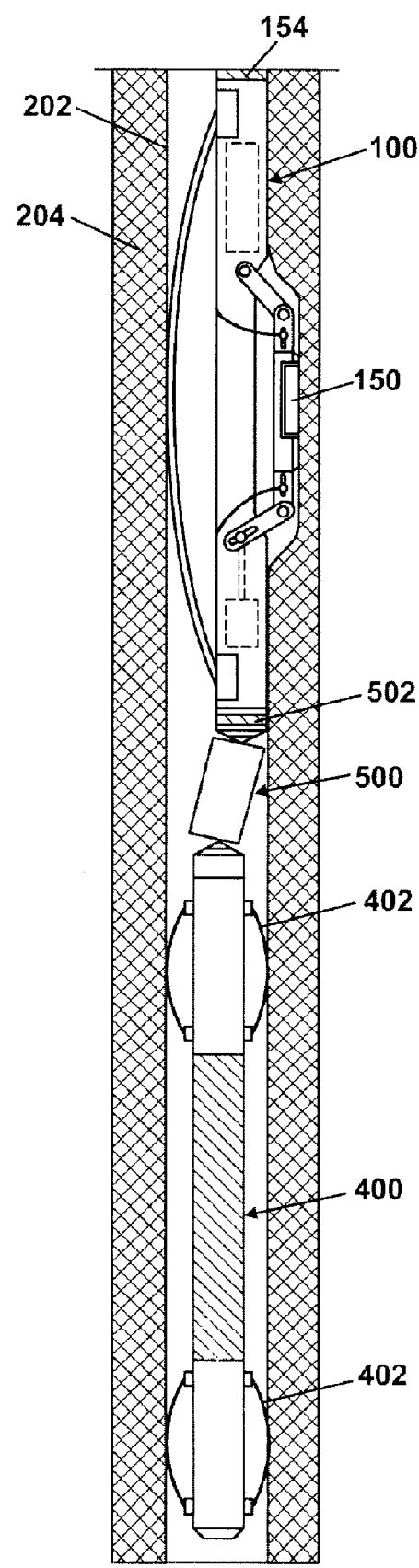

FIGS. 2A and 2B together form a complete assembly of a tool string 200 including the logging tool 100 of FIG. 1A The tool string 200 is disposed in a borehole 202 traversing formation 204. The tool string 200 may be conveyed inside the borehole 202 in a number of ways, including, but not limited to, on the end of a wireline, slickline, coiled tubing, or drill pipe. In one embodiment, the tool string 200 includes logging tools 300 (FIG. 2A) and 400 (FIG. 2B) attached to either ends of the logging tool 100. In one embodiment, the tool string 200 provides triple-combo logs. In one embodiment, the tool string 200 configured for triple-combo logging has a length on the order of 26 ft (7.9 m), which is considerably shorter than the length of the standard triple-combo tool. In this configuration, the logging tool 100 measures formation density and lateral formation resistivity, the logging tool 300 measures formation porosity and natural gamma radiation, and the logging tool 400 measures deep formation resistivity. In addition, any of these tools can be configured to measure borehole size without increasing the length of the tool string 200.

In one embodiment, the logging tool 300 (FIG. 2A) includes a neutron source 302 and neutron detectors 304, 306 for measuring formation porosity. The logging tool 300 may also include a gamma ray detector 308 for measuring natural gamma radiation. The logging tool 300 may further include a telemetry cartridge 310 for sending measurements to the surface and receiving commands from the surface. A bow spring 312 may be attached to the logging tool 300 to bias the logging tool 300 towards a side of the borehole 202, thereby improving response of the porosity and gamma radiation measurements.

In one embodiment, the logging tool 400 (FIG. 2B) is an induction tool. This tool 400 is preferably centralized within the borehole 202. Centralizers 402 may be provided on the logging tool 400 to centralize the logging tool 400 within the borehole 202. The logging tool 100 is a pad-based tool that makes contact with a surface of the borehole 202 to make measurements. To allow the logging tool 100 to contact a side of the borehole 202 while the logging tool 400 remains centralized within the borehole 202, a hinge joint 500 is provided between the logging tools 100, 400.

A mass isolation (or insulating) band 502 is placed at an end of the hinge joint 500. The mass isolation band 502 forms a pair with the mass isolation band 154 on the logging tool 100. The pair of mass isolation bands 154, 502 are placed generally symmetrically about the measure electrode 150. This allows the metal body of the logging tool 100 between the mass isolation bands 154, 502 to act as a bucking electrode. For lateral resistivity measurements, the bucking electrode is held at the same potential as the measure electrode 150 and thereby forces the current from the measure electrode 150 to run approximately perpendicular to the logging tool 100. This focuses the current emitted from the measure electrode 150 into the formation 204. The bucking and measure currents return on the metal bodies of tools above and below the mass isolation bands 154, 502. An isolated electrode (314 in FIG. 2A) at the top of the logging tool (300 in FIG. 2A) provides a distant reference voltage for the lateral resistivity measurement.

In operation, voltage on the metal surfaces of the tool string 200 between the mass isolation bands 154, 502 is maintained at a certain value, e.g., 1 V, and voltage above and below the mass isolation bands 154, 502 is maintained at a different voltage, e.g., at 0 V. Current flows from the measure electrode 150 to the formation 204 in proportion to the resistivity of the formation 204. The bucking electrode, i.e., the portion of the logging tool 100 between the mass isolation bands 154, 502, focuses the current flow from the measure electrode 150 in a direction generally perpendicular to the logging tool 100. Any downward-going current returns on the metal bodies of the hinge 500 and logging tool 400. Any upward-going current returns on the metal body of the logging tool (300 in FIG. 2A). The mass isolation bands 154, 502 separate the current return electrodes from the bucking electrode. The current emitted by the measure electrode 150 is measured by appropriate electronics in the logging tool 100 and translated to the resistivity of the formation 204. Resistivity measurements may be conducted simultaneously or alternately with density measurements.

While the invention has been described with respect to a limited number of embodiments, those skilled in the art, having benefit of this disclosure, will appreciate that other embodiments can be devised which do not depart from the scope of the invention as disclosed herein. It will also be appreciated that conventional components, connectors, electronics, and materials can be used to implement embodiments of the invention. The components (e.g. linkages, hinges, springs) used to implement embodiments of the invention may be formed of non-metallic materials or insulated materials.

What is claimed is:

1. An apparatus for logging a formation traversed by a borehole, comprising:
    a plurality of logging tools adapted for conveyance inside the borehole, the plurality of logging tools comprising:
    a tool body;
    a sensing pad responsive to a density property of the formation coupled to the tool body;
    a current emitting measure electrode responsive to a lateral resistivity property of the formation incorporated on the sensing pad;
    a mechanism coupled to the tool body for urging the sensing pad into contact with a side of the borehole coupled to the tool body; and
    a pair of mass isolation bands disposed about the tool body to isolate a mass of the tool body adjacent the measure electrode and enable the tool body mass to function as a bucking electrode, wherein a first mass isolation band of the pair of mass isolation bands is disposed at a position on the tool body above the sensing pad and a second mass isolation band of the pair of mass isolation bands is disposed at a position on the tool body below the sensing pad.

2. The apparatus of claim 1, wherein the mass isolation bands are disposed generally symmetrically about the measure electrode.

3. The apparatus of claim 1, wherein the plurality of logging tools comprises a tool selected from the group consisting of sonic, propagation resistivity, neutron, gamma ray, nuclear magnetic resonance, formation pressure, imaging, dipmeter, and ultrasonic caliper tools.

4. The apparatus of claim 1, wherein the plurality of logging tools comprises a gamma ray neutron tool and an induction tool each coupled to a distal end of the tool body.

5. The apparatus of claim 4, further comprising a hinge joint disposed between the tool body and the induction tool.

6. The apparatus of claim 4, further comprising a bias member disposed on the neutron tool for urging the neutron tool in contact with a side of the borehole.

7. The apparatus of claim 5, further comprising a centralizer disposed on the induction tool for centralizing the induction tool in the borehole.

8. The apparatus of claim 1, wherein the mechanism for urging the sensing pad comprises a flexible member coupled to a first side of the tool body and adapted to urge the sensing which pad is coupled to the second side of the tool body into contact with the side of the borehole.

9. The apparatus of claim 8, wherein the mechanism for urging the sensing pad further comprises one or two linkage arms coupling the sensing pad to the second side of the tool body.

10. The apparatus of claim 9, wherein the mechanism for urging the sensing pad further comprises one or more springs coupled between the sensing pad and the tool body, the one or more springs configured to bias the sensing pad away from the tool body.

11. The apparatus of claim 9, wherein one of the linkage arms is slidable relative to the tool body, thereby allowing the sensing pad to be deployable and retractable relative to the tool body.

12. The apparatus of claim 1, wherein the measure electrode is built on a non-conductive pad and mounted on a face of the sensing pact, the sensing pad being isolated from the tool body and acts as the measure electrode responsive to density properties of the formation.

13. An apparatus for logging a formation traversed by a borehole, comprising:
    a tool body adapted for conveyance inside the borehole;
    a sensing pad responsive to a density property of the formation coupled to the tool body;
    a current emitting measure electrode responsive to a lateral resistivity property of the formation incorporated on the sensing pad; and
    a mechanism coupled to the tool body for urging the sensing pad into contact with a side of the borehole; and
    a pair of mass isolation bands disposed about the tool body to isolate a mass of the tool body adjacent the measure electrode and enable the tool body mass to function as a bucking electrode, wherein a first mass isolation band of the pair of mass isolation bands is disposed at a position on the tool body above the sensing pad and a second mass isolation band of the pair of mass isolation bands is disposed at a position on the tool body below the sensing pad.

14. The apparatus of claim 13, wherein the measure electrode is built on a non-conductive pad and mounted on a face of the sensing pad, the sensing pad being isolated from the tool body and acts as the measure electrode responsive to density properties of the formation.

15. The apparatus of claim 13, wherein the mechanism for urging the sensing pad comprises a flexible member coupled to a first side of the tool body and adapted to urge the sensing pad coupled to the second side of the tool body into contact with the side of the borehole.

16. The apparatus of claim 15, wherein the mechanism for urging the sensing pad further comprises one or two linkage arms coupling the sensing pad to the second side of the tool body and one or more springs coupled between the sensing pad and the tool body, the one or more springs configured to bias the sensing pad away from the tool body.

17. A method of logging a formation traversed by a borehole, comprising:
- disposing in the borehole a tool body carrying a sensing pad responsive to a density property and lateral resistivity property of the formation;
- moving the tool body in the borehole while urging the sensing pad in contact with a side of the borehole;
- emitting a current from a measure electrode incorporated on the sensing pad;
- measuring flow of the current into the formation, wherein the flow of the current is indicative of to the lateral resistivity of the formation; and
- emitting gamma radiation from a gamma source incorporated in the sensing pad; and
- detecting gamma particles returning from the formation, wherein energies of the gamma particles are proportional to the density property; and
- focusing the flow of current from the measure electrode in a direction generally perpendicular to the tool using an isolated mass of the tool body confined by a pair of mass isolation bands, wherein a first mass isolation band of the tool body above the sensing pad and a second mass isolation band of the pair of mass isolation bands is disposed at a position on the tool body below the sensing pad.

* * * * *